United States Patent
Jesse et al.

(10) Patent No.: US 9,563,415 B2
(45) Date of Patent: Feb. 7, 2017

(54) GENERATING VISUALLY ENCODED DYNAMIC CODES FOR REMOTE LAUNCHING OF APPLICATIONS

(71) Applicants: Stefan Jesse, Sinsheim (DE); Martin Kolb, Hambruecken (DE); Hans-Peter Schaerges, Mannheim (DE)

(72) Inventors: Stefan Jesse, Sinsheim (DE); Martin Kolb, Hambruecken (DE); Hans-Peter Schaerges, Mannheim (DE)

(73) Assignee: SAP SE, Walldorf (DE)

( * ) Notice: Subject to any disclaimer, the term of this patent is extended or adjusted under 35 U.S.C. 154(b) by 438 days.

(21) Appl. No.: 13/903,094

(22) Filed: May 28, 2013

(65) Prior Publication Data

US 2014/0359578 A1   Dec. 4, 2014

(51) Int. Cl.
  *G06F 9/44* (2006.01)
  *G06F 9/445* (2006.01)
(52) U.S. Cl.
  CPC ...................................... *G06F 8/61* (2013.01)
(58) Field of Classification Search
  None
  See application file for complete search history.

(56) References Cited

U.S. PATENT DOCUMENTS

| | | | |
|---|---|---|---|
| 7,905,411 B2 | 3/2011 | Ibe | |
| 8,292,178 B2 | 10/2012 | Chaves | |
| 8,296,477 B1 | 10/2012 | Polk | |
| 8,352,903 B1 * | 1/2013 | Friedman | 717/100 |
| 8,438,245 B2 | 5/2013 | Chor | |
| 8,622,306 B2 | 1/2014 | Matsumoto | |
| 8,656,353 B2 * | 2/2014 | Brendza et al. | 717/109 |
| 8,745,617 B1 * | 6/2014 | Stekkelpak et al. | 717/178 |
| 8,814,037 B2 | 8/2014 | Duquenoy-Bernaudin et al. | |
| 2003/0065784 A1 * | 4/2003 | Herrod | 709/227 |
| 2009/0300106 A1 * | 12/2009 | Woodside et al. | 709/203 |
| 2010/0262619 A1 * | 10/2010 | Zargahi et al. | 707/770 |
| 2011/0185354 A1 * | 7/2011 | Tanner et al. | 717/178 |

(Continued)

OTHER PUBLICATIONS

Ingrid Bernaudin et al.; US Utility Application under 35 USC 111 (a): Subscription of a user; filed on Oct. 31, 2012 with the USPTO under U.S. Appl. No. 13/665,108; 60 pages.

(Continued)

*Primary Examiner* — Insun Kang

(57) ABSTRACT

Users design and develop a current version of an application to be rendered on different devices. The application is configured and deployed with its current version on a platform server. The application can run on different servers provided from different platforms. A desktop browser displays the current version of the application by loading a Uniform Resource Locator (URL). The current version of the application can be tested both on a desktop browser and on a browser, installed on a remote device. Additionally, a visually encoded dynamic code is generated that is scanned by a remote device to launch the deployed version of the application. The visually encoded dynamic code encrypts dynamic information for locating the deployed application that is dependent on the platform server used for deployment. After displaying the current version on the remote device, further points for improvement of the design and functionality of the application are defined.

10 Claims, 12 Drawing Sheets

(56) References Cited

U.S. PATENT DOCUMENTS

| | | | |
|---|---|---|---|
| 2012/0036225 A1* | 2/2012 | Chor | 709/219 |
| 2012/0036226 A1* | 2/2012 | Chor | 709/219 |
| 2012/0136949 A1* | 5/2012 | Virani et al. | 709/206 |
| 2012/0173747 A1 | 7/2012 | Roesch | |
| 2012/0221657 A1* | 8/2012 | Zeevi et al. | 709/206 |
| 2012/0233107 A1 | 9/2012 | Roesch | |
| 2012/0330845 A1* | 12/2012 | Kang | 705/71 |
| 2013/0019284 A1* | 1/2013 | Pacyga et al. | 726/4 |
| 2013/0035787 A1 | 2/2013 | Canter | |
| 2013/0098990 A1 | 4/2013 | Cameron et al. | |
| 2013/0148891 A1 | 6/2013 | Yassin | |
| 2013/0167208 A1 | 6/2013 | Shi | |
| 2013/0205277 A1* | 8/2013 | Seven et al. | 717/121 |
| 2013/0239086 A1* | 9/2013 | Brendza et al. | 717/109 |
| 2013/0290326 A1* | 10/2013 | Lebedev | 707/736 |
| 2013/0305218 A1* | 11/2013 | Hirsch et al. | 717/106 |
| 2013/0317907 A1 | 11/2013 | Duan et al. | |
| 2014/0040941 A1 | 1/2014 | Sabatino et al. | |
| 2014/0053126 A1 | 2/2014 | Watson et al. | |
| 2014/0067530 A1 | 3/2014 | Pluche et al. | |
| 2014/0082610 A1* | 3/2014 | Wang et al. | 717/178 |
| 2014/0108606 A1* | 4/2014 | Beadles | 709/217 |
| 2014/0110468 A1 | 4/2014 | Kandregula | |
| 2014/0130035 A1* | 5/2014 | Desai et al. | 717/172 |
| 2014/0156376 A1* | 6/2014 | Sellers et al. | 705/14.38 |
| 2014/0181256 A1* | 6/2014 | Trifa et al. | 709/218 |
| 2014/0201286 A1* | 7/2014 | Kristensen | 709/204 |
| 2014/0223412 A1* | 8/2014 | Stracquatanio, III | 717/107 |
| 2014/0297787 A1* | 10/2014 | Baugh et al. | 709/217 |
| 2014/0350704 A1* | 11/2014 | Lyons et al. | 700/91 |
| 2014/0365900 A1* | 12/2014 | Chu et al. | 715/738 |
| 2015/0020006 A1* | 1/2015 | Kotzer | 715/762 |

OTHER PUBLICATIONS

Oliver Caudron; US Utility Application under 35 USC 111 (a): Synchronizing Data Related to Workflow; filed on Sep. 13, 2012 with the USPTO under U.S. Appl. No. 13/615,576; 36 pages.

Peter Eberlein; US Utility Application under 35 USC 111 (a): Mobile Mapping of Quick Response (QR) Codes to Web Resources; filed on Oct. 30, 2012 with the USPTO under U.S. Appl. No. 13/663,745; 33 pages.

Godfrey Hobbs; US Utility Application under 35 USC 111 (a): Delivering Report Characterization Information; filed on Jun. 4, 2012 with the USPTO under U.S. Appl. No. 13/487,324; 38 pages.

* cited by examiner

| Sales Analysis |||||||
|---|---|---|---|---|---|---|
| Design Environment – Sales Analysis 200 |||||||
| 210 Filter 208 [ ▼ ] Sales Actual, US Dollar | Show Settings ||||||
| Customer ▲ | Product ▲ | Store Sales ▲▼ | Unit Sales ▲▼ | store_ cost ▲▼ | Settings 220 ||
| Derry | Faux Products Laundry Detergent | 4,46 | 2,00 | 1,38 | Currency <br> [ US Dollar ▼ ] <br> [ Euro ] <br><br><br><br><br><br><br><br><br> Measures <br> [ Sales Act. ▼ ] <br> [ Sales Plan ] ||
| | High Top Beets | 6,81 | 3,00 | 3,41 | ||
| | Super Brown Sugar | 4,26 | 3,00 | 1,53 | ||
| | Big Time Low Fat Waffles | 3,36 | 3,00 | 1,41 | ||
| | Red Wing 60 Watt Lightbulb | 5,32 | 4,00 | 1,60 | ||
| | Imagine Chicken TV Dinner | 7,35 | 3,00 | 3,01 | ||
| | Consolidated Tartar Control Toothpaste | 6,39 | 3,00 | 3,00 | ||
| | Monarch Spaghetti | 2,76 | 2,00 | 1,06 | ||
| | American Roasted Chicken | 8,91 | 3,00 | 3,47 | ||
| | Skinner Strawberry Drink | 6,84 | 3,00 | 2,05 | ||
| | Pleasant Canned Tuna in Water | 8,88 | 3,00 | 3,37 | ||
| | Lake Low Fat Cole Staw | 2,79 | 3,00 | 0,89 | ||
| | CDR Hot Chocolate | 5,56 | 2,00 | 1,78 | ||
| | Result | 73,69 | 37,00 | 27,98 | ||
| Gutierrez | Moms Sliced Turkey | 1,08 | 2,00 | 0,52 | ||
| | Result | 1,08 | 2,00 | 0,52 | ||
| | Club Sharp Cheddar Cheese | 18,05 | 5,00 | 8,30 | ||
| | Atomic Bubble Gum | 13,32 | 4,00 | 5,33 | ||
| | BBB Best Strawberry Preservers | 11,20 | 4,00 | 4,26 | ||

| Mobile device 265 | | | | |
|---|---|---|---|---|
| Analysis Application 267 | | | | Show Settings |
| Sales Analysis | | | | |
| Filter | | | | |
| Customer ▲ | Product ▲ | Store Sales ◆ | Unit Sales ◆ | store_cost ◆ |
| Derry | Faux Products Laundry Detergent | 4,46 | 2,00 | 1,38 |
| | High Top Beets | 6,81 | 3,00 | 3,41 |
| | Super Brown Sugar | 4,26 | 3,00 | 1,53 |
| | Big Time Low Fat Waffles | 3,36 | 3,00 | 1,41 |
| | Red Wing 60 Watt Lightbulb | 5,32 | 4,00 | 1,60 |
| | Imagine Chicken TV Dinner | 7,35 | 3,00 | 3,01 |
| | Consolidated Tartar Control Toothpaste | 6,39 | 3,00 | 3,00 |
| | Monarch Spaghetti | 2,76 | 2,00 | 1,06 |
| | American Roasted Chicken | 8,91 | 3,00 | 3,47 |
| | Skinner Strawberry Drink | 6,84 | 3,00 | 2,05 |
| | Pleasant Canned Tuna in Water | 8,88 | 3,00 | 3,37 |

Preferences 500

Type filter text

Application Design 510
Scripting

Application Design 515
General

Preferred Startup Mode 520   Local Mode

Undo History Size:

Local Mode 525
SAP BusinessObjects BIPlatform 530
SAP HANA 535
SAP NetWeaver 540

Network Port 7777 (1024 – 65535, set to 0 for auto – assign) 545

[V] 550   Allow external access to embedded Web server

Application Recovery
[V] Save application recovery information every 5 minutes

Member Selection
Maximum number of members to fetch from beckend in dialog: [1000]
Maximum number of members to fetch from backend in content assistance:[20]
Display warnings for manually entered invalid values Templates [D:\...\templates]   Browse Restore default
OK   Cancel

FIG.5

GENERATING VISUALLY ENCODED DYNAMIC CODES FOR REMOTE LAUNCHING OF APPLICATIONS

BACKGROUND

The fast-changing business environment affects product cycles in the software development industry. Requirements and models for delivering software applications are constantly changing. Businesses expand into new geographies and use new customer-facing channels. Information is distributed through networks, data centers, business systems, market-places, etc. Information technology (IT) solutions support all kind of channels for consumption of data provided through software application. Business users demand easy remote access to enterprise application and data on multiple personal or corporate mobile devices, e.g. smart phones, tablets, etc. More and more mobile devices are used to access information and handle tasks—anywhere and anytime.

User's demands in the area of mobility also impose new requirements on software developers and on the development platform they use when designing new applications. When developing an application, the developer may also work on a mobile version for that application. The development cycle of generating desktop and mobile versions for a software program includes similar iterations, such as design, implementation, testing, maintenance, etc. Software testing is an important phase of the software development process that ensures that defects may be recognized. When possible, the testing activities may be performed on a similar hardware and software environment to the environment of the potential customers or end-users.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 2A is a block diagram illustrating an embodiment of an analytical application designed for desktop and remote rendering.

FIG. 2C is a block diagram illustrating an embodiment of an analysis application deployed on an on-premise platform that is displayed on a mobile device.

FIG. 5 is a block diagram illustrating an embodiment of an exemplary environment for configuring the deployment of applications in different modes.

DETAILED DESCRIPTION

Embodiments of techniques for in-database provisioning of data are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
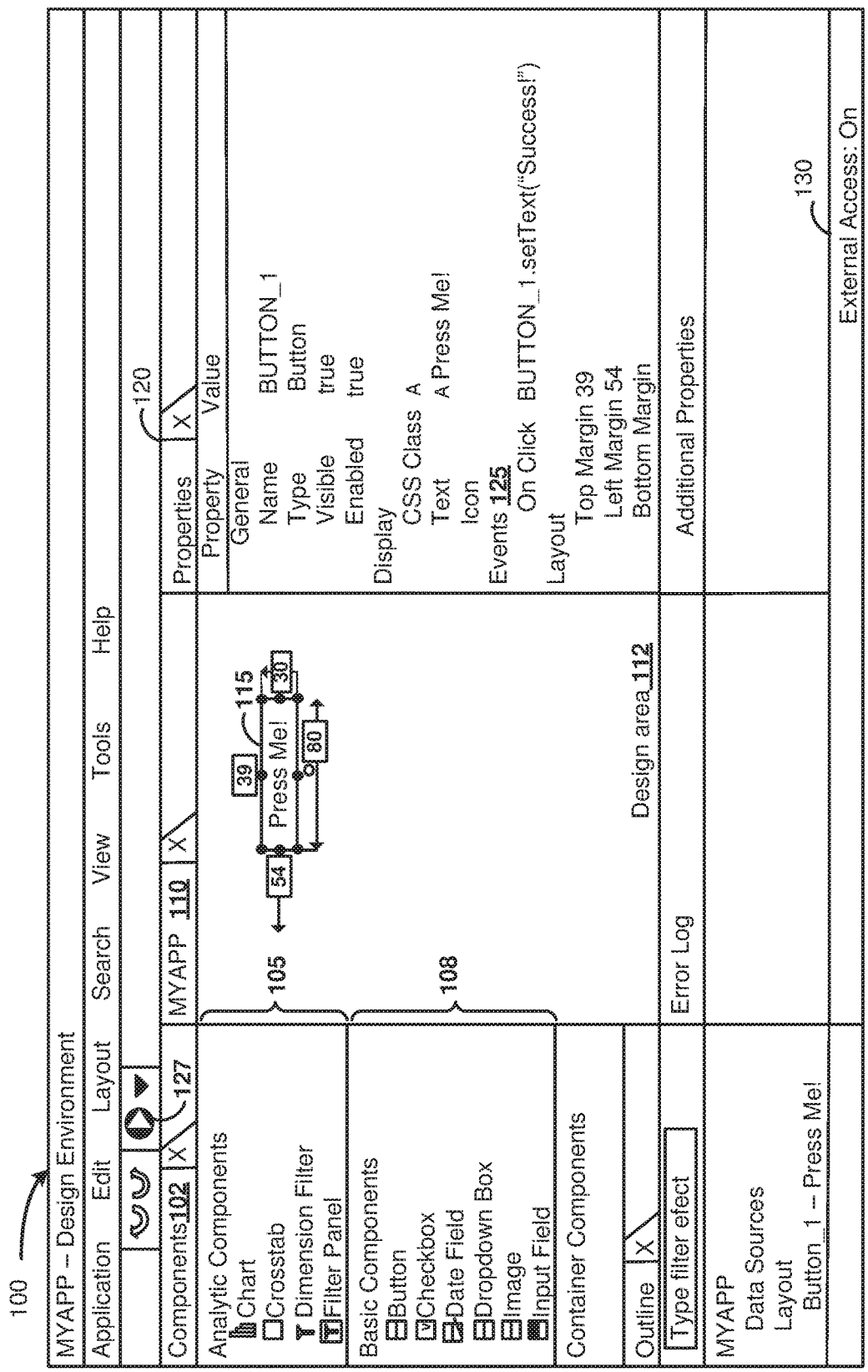
FIG. 1 is a block diagram illustrating an embodiment of an environment for designing and developing applications for desktop and remote rendering.

FIG. 1 is a block diagram illustrating an embodiment of an environment 100 for designing and developing applications for desktop and remote rendering. The environment 100 provides tools and options for generating applications by utilizing available components from a Components 102 section that has several subsections—Analytic Components 105, Basic Components 108, Container Components, etc. The Analytic Components 105 section provides the option to insert charts, cross tabulations (crosstab), filters, etc. when designing and developing an application. The Basic Components 108 section includes buttons, checkboxes, fields, images, etc., that may be used and inserted in design area 112 when building applications. For example, MYAPP 110 is an open editor tab having the design area 112 where a web application can be generated. A button 115 "Press Me!" is inserted into the design area 112. The button 115 may be dragged and dropped from the Basic Components 108 subsection and may be part of the generated graphical user interface (GUI) for the application. The position of an element from the GUI is relevant not only for applications developed for desktop browsers, but also for browsers on remote devices, e.g. mobile devices. The design area 112 provides details about the position of an element according to the predefined properties of the GUI design size, which is targeted for the application. The design size may depend on the type of device, e.g. remote device that is used for rendering the application.

In the environment 100, properties for the elements included in the GUI of the designed application may be displayed in a Properties 120 section. The Properties 120 section may include general details about the elements, specifying whether the element is a button, a chart, or a plain text field. In addition, in the Properties 120 section may include a description of the event associated with the element that is included in the GUI, such as Events 125 property of the button 115. For example, the button 115 is connected with an event representing a click on the button 115 (for example by an end user) that results in displaying a text message—"Success!". The button 127 may be used to run and deploy the developed application in the environment 100. The deployment may be accomplished on an application server and the deployed application may be accessed through a browser application that may access the location on the server that stores the deployed application. After an application is deployed, it may be tested on a desktop machine or a remote device. Based on testing activities, a new version of the application may be developed in the design area 112 and then a new deployment will be required. In one embodiment, when the application is designed for mobile rendering, a mobile device may access the link generated through the deployment step and the application may be tested. Permission is requested to access the location where the application is stored on a mobile device. The environment 100 may include option for external access. When permission is given to external remote devices, then in the user interface (UI) of the environment 100 a label 130 may display the status—"External Access: ON". The location of the deployed application may be defined in form of a Uniform resource locator (URL) that can be launched through a network connection. In one embodiment, the generated URL may be different each time the application is deployed. For example, the generated URL may include dynamic parts that distinguish one deployed version of the application from another. A number of versions of an application may be generated through the development phase, and therefore a number of deployment operations may be performed when testing each of the versions.

FIG. 2A is a block diagram illustrating an embodiment of an analytical application 200 designed for desktop and remote rendering. The analytical application 200 is a web application for sales analysis that may be designed and developed in an environment, such as the environment 100. In one embodiment, the analytical application 200 may be opened and displayed in a web browser on a desktop machine that may connect to the location where the application is deployed. In another embodiment, the application 200 may be opened within the design environment that is used during the development phase of the application. The GUI of the application includes different elements, such as a table 210 that is a cross tabulation providing details for different customers and their purchases. The table 210 includes columns "Customer", "Product", "Store Sales", "Unit Sales", "Store_Cost". The GUI also includes a Filter 208 box to allow filtering of some fields from the table 210 based on filtering criteria. The GUI may further include a Settings 220 section as part of the analytical application 200 where a user may define settings relevant to the table 210, e.g. currency (US Dollar, Euro, etc.), different measures, other.

Figure 2B:
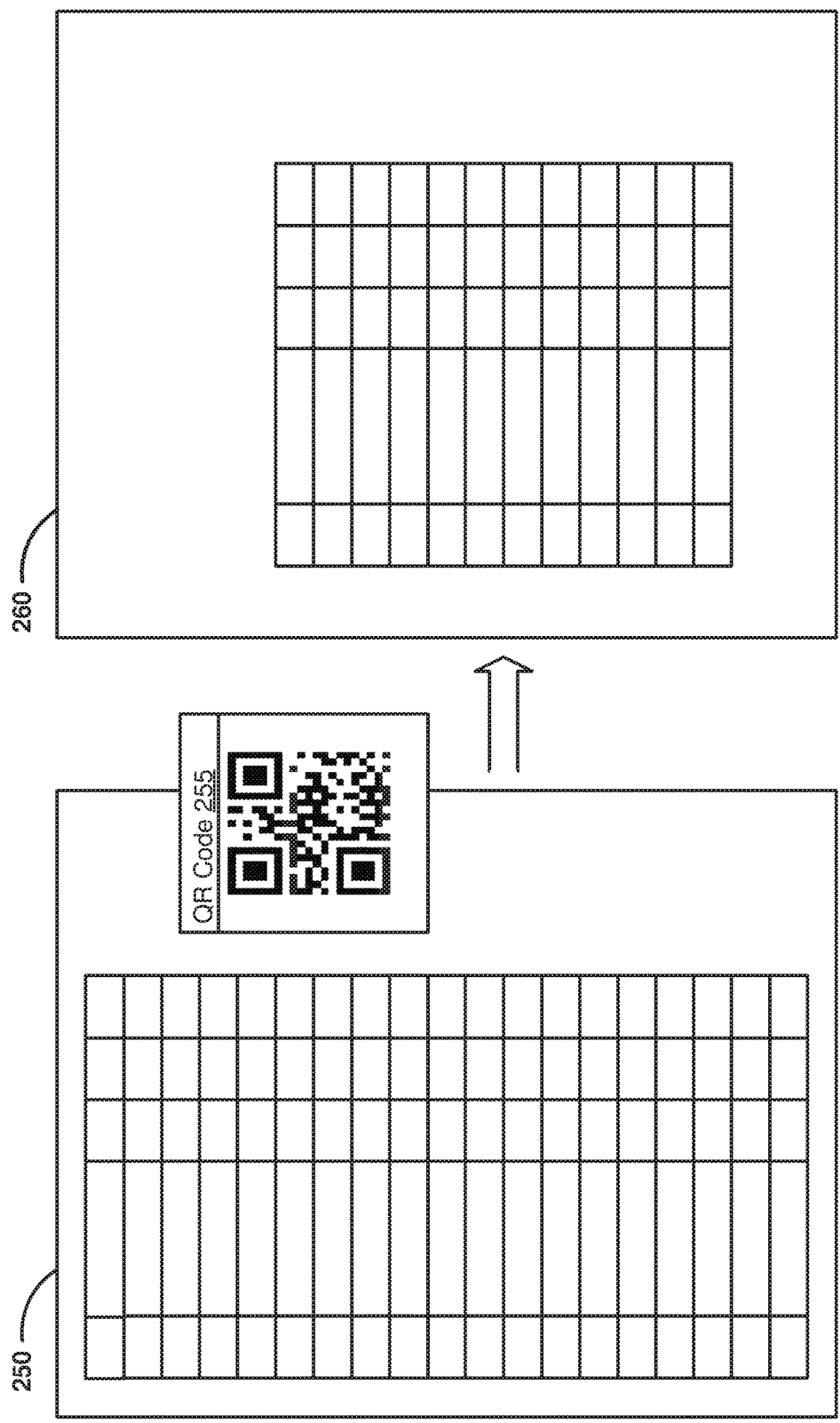
FIG. 2B is a block diagram illustrating an embodiment of an application that is displayed on a mobile device through scanning of a Quick Response (QR) code.

FIG. 2B is a block diagram illustrating an embodiment of an application 250 that is displayed on a mobile device through scanning of a visually encoded dynamic code that encrypts information about the location of the deployed application 250. In one embodiment, the visually encoded dynamic code may be in the form of a Quick Response (QR) code 255. In another embodiment, the visually encoded dynamic code may be an Aztec Code, which is a matrix barcode built on a square grid with a bulls-eye at its center. Other embodiments of visually encoded dynamic codes are a PDF417, a bar code, etc. The visually encoded dynamic codes may be any form of a visual code that may encrypt text and numeric data that may be used to identify a deployed application. Through the development phase of an application, the developer performs steps to design the UI and implement the functionality required for the application. In one embodiment, in an environment (e.g. environment 100, FIG. 1) a developer who designs an analytical application such as the application 200 in FIG. 2A, may first insert in the design area a cross tabulation in the form of a table. After inserting the table, such as the table 210 in FIG. 2A, the design may be tested. In one embodiment, the design may be tested on a local machine or a remote device depending on the goal of the application and its targets. The presented element may be a cross tabulation where data may be displayed to end users. The web browser may display the saved elements included in the UI of the analytical application 200.

In one embodiment, the application 200 may be deployed on a server and may be displayed in a web browser. The server that is used for the deployment may be an embedded application server part of the design environment or an external server part of a development platform. In another embodiment, the deployment of the analytical application 200 may further include generation of a visually encoded dynamic code corresponding to the destination where the deployed application is stored and that location may be accessed through a network connection. For example, the location may be defined as an URL. In one embodiment, the location may be different for each deployment of a version of an application. The URL may include dynamic parts that represent specific characters of the deployment—the server used for the deployment, the developer's session, the name of the application, the version, etc.

In one embodiment, the target of the developed analytical application 200 may be a user that launches the application 200 on a remote device. Therefore, the testing operations over the application may be performed on a remote device. The way that the application appears on a remote device may correspond to the display on the web browser 250. In one embodiment, there can be some differences in the display due to different resolution characteristics, display size, etc. The URL may be encoded in form of a Quick Response (QR) code, such as QR Code 255. A QR code may be read from the remote device. For example, the QR Code 255 may be decoded using a camera and a scanning application on a mobile device 260, e.g. tablet. The mobile device 260 may have the capability to scan the QR Code 255 and also may have access to the network where the deployed analytical application is stored. The mobile device 260 may render the current version of the analytical application and provide the possibility for testing in a real environment.

FIG. 2C is a block diagram illustrating an embodiment of an analysis application 267 deployed on an on-premise platform that is displayed on a mobile device 265. In one embodiment, the analysis application 267 may be the analytical application 200 in FIG. 2A, and may also be designed, developed, and deployed in an environment, such as the environment 100, FIG. 1. When the target group for the analysis application 267 is remote users that may connect with the application from remote devices (e.g. mobile device), the design and development phases are planned and coordinated accordingly and the testing phase may be performed on the remote device. The remote device may be authorized to access the deployed version of the tested analytical application 267 through a secure network connection. The development and testing phases may be iterative steps in a cycle, which means that the analysis application 267 may be tested a number of times even before its design is finished in order to catch errors or misconceptions in an early phase of the development. In one embodiment, the testing operations may be performed by the designated developer that works on the generation of the application 267, but may also be performed by customers or end users involved in the development phase. For example, when the analysis application 267 is developed up to a phase when it looks like the version of the analytical application 200 on FIG. 2A, then the analysis application 267 may be rendered on a mobile device, such as a mobile device 265. Testing operations may be performed on the analysis application 267 on the mobile device 265, which may result in changes in the design and the implementation of some features of the application. Therefore, the analysis application 267 may be opened in a development environment and changes may be applied. To preview the changed version of the analysis application 267, a new deployment steps is performed that may generate a new URL for accessing the deployed application. In one embodiment, the deployment step may be further enhanced to generate a QR code, such as the QR Code 255 for launching the analytical application's new version on the mobile device 265.

Figure 3:
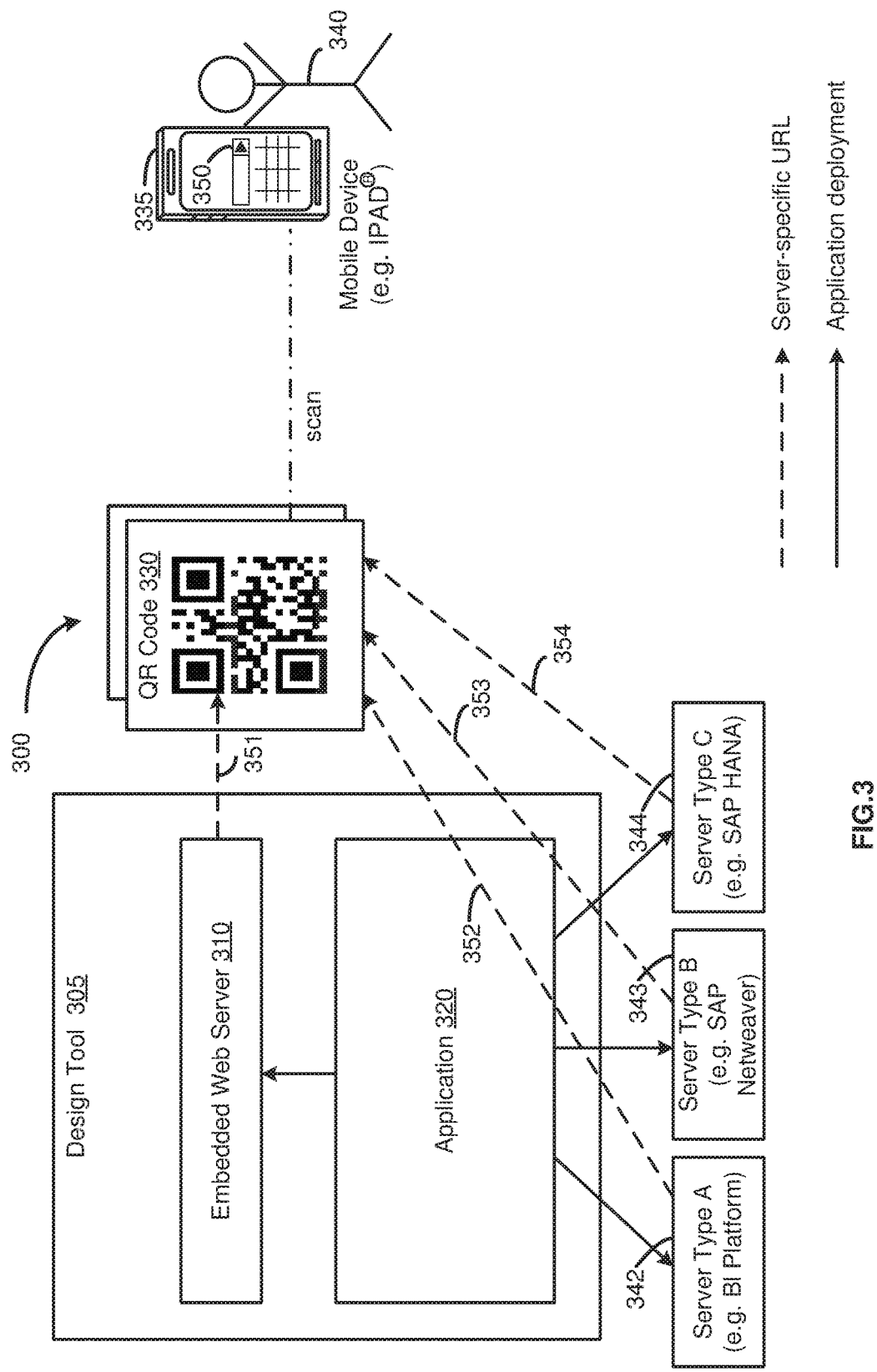
FIG. 3 is a block diagram of the embodiment of a system for deploying an application and generating a visually encoded dynamic code for loading the application onto a mobile device.

FIG. 3 is a block diagram of an embodiment of a system 300 for deploying an application and generating a visually encoded dynamic code for loading the application onto a mobile device. In one embodiment, a design tool 305 may be used to design and develop an application 320. For example, the design tool 305 may be such as SAP® BusinessObjects™ Design Studio provided by SAP AG. The application 320 may be deployed on an embedded web server 310. In another embodiment, the application 320 may be deployed on a server provided by a platform. For example, the platform used for the deployment may be an on-premise platform such as SAP® BusinessObjects™ Business Intelligence Platform, SAP NetWeaver® platform, SAP HANA® platform provided by SAP AG. In another embodiment, the platform used during the deployment step may be an on-demand platform. The application 320 may be deployed on a server type A 342 provided by the SAP® BusinessObjects™ Business Intelligence Platform, on a server type B 343 provided by SAP NetWeaver® platform, or server type C 344 provided by SAP HANA® platform. After a version of the application 320 is designed and developed, the application 320 may be deployed on a server, which is not limited to the provided examples.

In one embodiment, during the deployment step, a visually encoded dynamic code that corresponds to a location, where application 320 may be launched, is generated. In one embodiment, the visually encoded dynamic code may be a QR Code 330. Application 320 may be deployed on each of the servers—the embedded web server 310, the server type A 342, the server type B 343 and the server type C 344. When the application 320 is deployed, the deployed version may be accessed from a desktop browser by connecting to an URL that corresponds to the deployed version. The generated URL may be server and platform specific, may be user specific, may be specific for the version that is deployed, etc. In one embodiment, the generated QR Code 330 may be generated from one of the deployment operations 351-354, and each of the QR codes corresponds to the generated URLs and allows the deployed version of the application 320 to be accessed from a browser application. The QR code 330 may be scanned from a mobile device 335, e.g. tablet, mobile phone, portative device, etc. For example, the device may be an IPAD® version provided by Apple Inc. In one embodiment, the mobile device may have a camera to assist in the scanning operation. The scanning may be accomplished with the use of a scanning application installed on the mobile device. The mobile device 335 may have a UI 350 where, after scanning the QR code 330 a mobile browser can be opened and the version of the deployed application 320 may be presented. In one embodiment, the mobile device 335 may be authorized to access the URL (encrypted in the QR code 3300) that is generated during the deployment step. In another embodiment, a user 340 is authorized to access the deployed version of the application 320. The user 340 may be a developer who had used the design tool 305 to design and develop the version of the application 320. In one embodiment, it may be required that the user 340 authenticates with one and the same credentials before the design tool and the mobile device 335. In another embodiment, the user 340 may be a developer that tests the designed version of the deployed application 320 on the mobile device 335.

Figure 4:
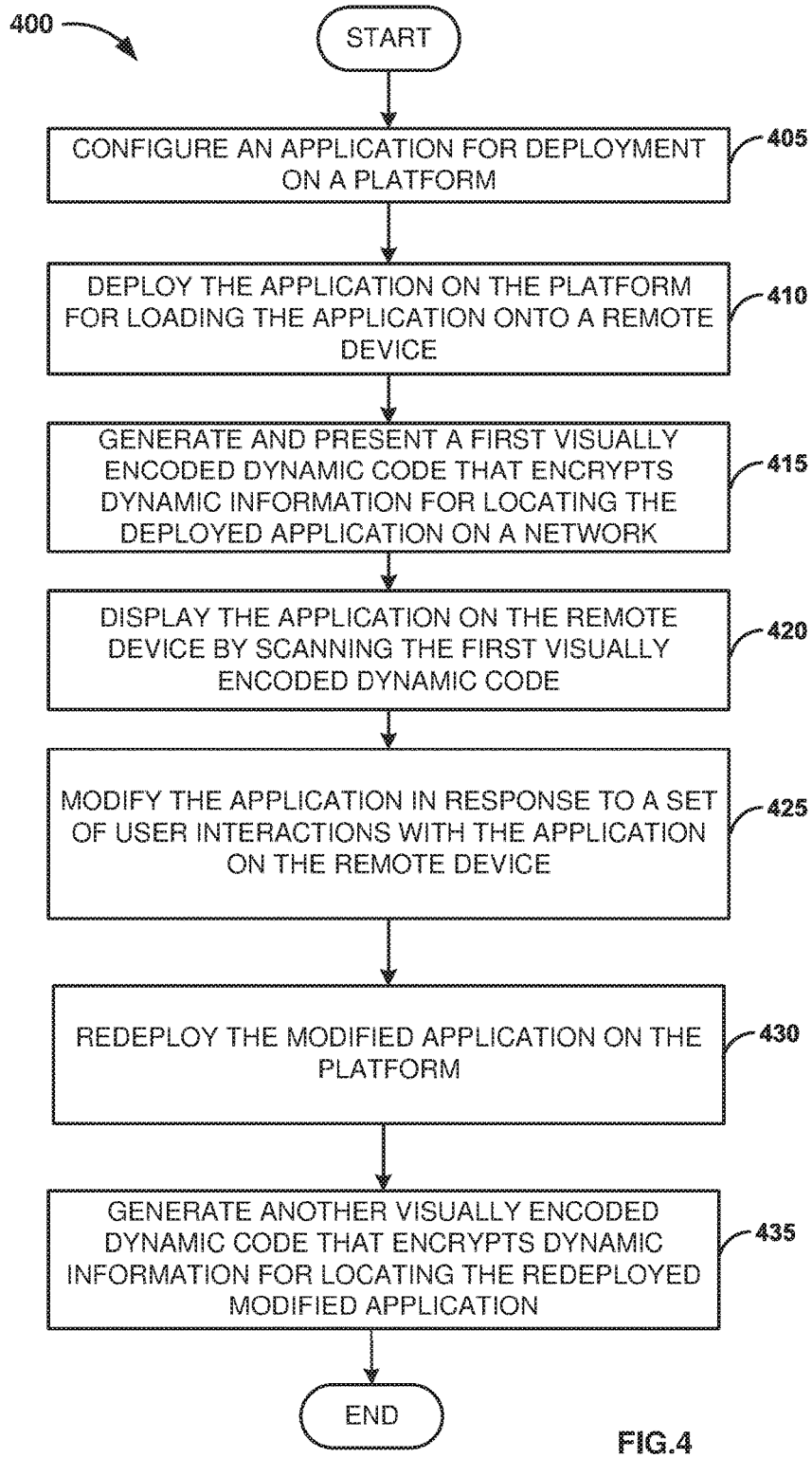
FIG. 4 is a flow diagram illustrating an embodiment of a method for generating a visually encoded dynamic code for loading an application onto a remote device.

FIG. 4 is a flow diagram illustrating an embodiment of a method 400 for generating a visually encoded dynamic code for loading an application onto a remote device. At step 405, the application is configured to be deployed on a platform. In one embodiment, the application may be the analytical application 200, FIG. 2 and the platform may be such as the examples provided in FIG. 3. The application may be configured to run on a server part of the platform. At step 410, the application is deployed on the platform. The application may be a mobile application that will be further targeted for loading on a remote device. More, the application may be a web application that may be used on both desktop machines and remote device. For the deployed application, at step 415, a first visually encoded dynamic code is generated that corresponds to the location where the deployed application can be accessed through a network connection. For example, the first visually encoded dynamic code corresponds to a URL generated for accessing the deployed application. Further, at step 415, the first visually encoded dynamic code may be presented for scanning by the remote device, which will load the application. At step 420, the application is displayed on the remote device by scanning the first visually encoded dynamic code.

At step 425, the application is modified, for example in a development environment, such as the environment 100, FIG. 1, or the design tool 305, FIG. 3. In one embodiment, a developer who tests the application may execute a scenario with the application on the remote device to simulate a real customer's scenario. For example, the tested application may be the analytical application 200, FIG. 2. Based on the accomplished test, the application may be modified in the development environments to address the results of the test. After the application is modified, a new deployment may be accomplished at process step 430. In one embodiment, the configuration for the next deployment may modify configuration details, such as the platform that is used for the deployment. At step 435, another visually encoded dynamic code corresponding to the redeployed application is generated. The new visually encoded dynamic code corresponds to the modified version and encrypts dynamic information for location the redeployed modified application. In one embodiment, the encrypted dynamic information may comprise platform specific details that are dynamically generated for each deployment of an application of the platform.

FIG. 5 is a block diagram illustrating an embodiment of an exemplary environment 500 for configuring the deployment of applications in different modes. A Preference 510 tool may be used for configuring an application on an application design 515 page. In the application design 515 page, general settings such as a preferred startup mode 520 may be defined. The preferred startup mode may define the platform that is used for deploying the application. In one embodiment, the preferred startup mode may be selected from a local mode 525, a SAP® BusinessObjects™ BI Platform 530, SAP Hana 535, and SAP NetWeaver 540. These modes correspond to different platforms that provide servers, which may be used for deployment of the application. For example, they may correspond to a local embedded web server, such as the embedded web server 310, FIG. 3, the SAP® BusinessObjects™ Business Intelligence Platform, the SAP NetWeaver® platform, and the SAP HANA® platform. The Preference 510 tool may provide details for a network port 545 to be associated with an Internet Protocol (IP) address for locating the configured application in one of the preferred startup modes. Within the Preference 510 tool, external access to the deployed application that is configured in the environment 500 may be allowed through checkbox 550.

Figure 6:
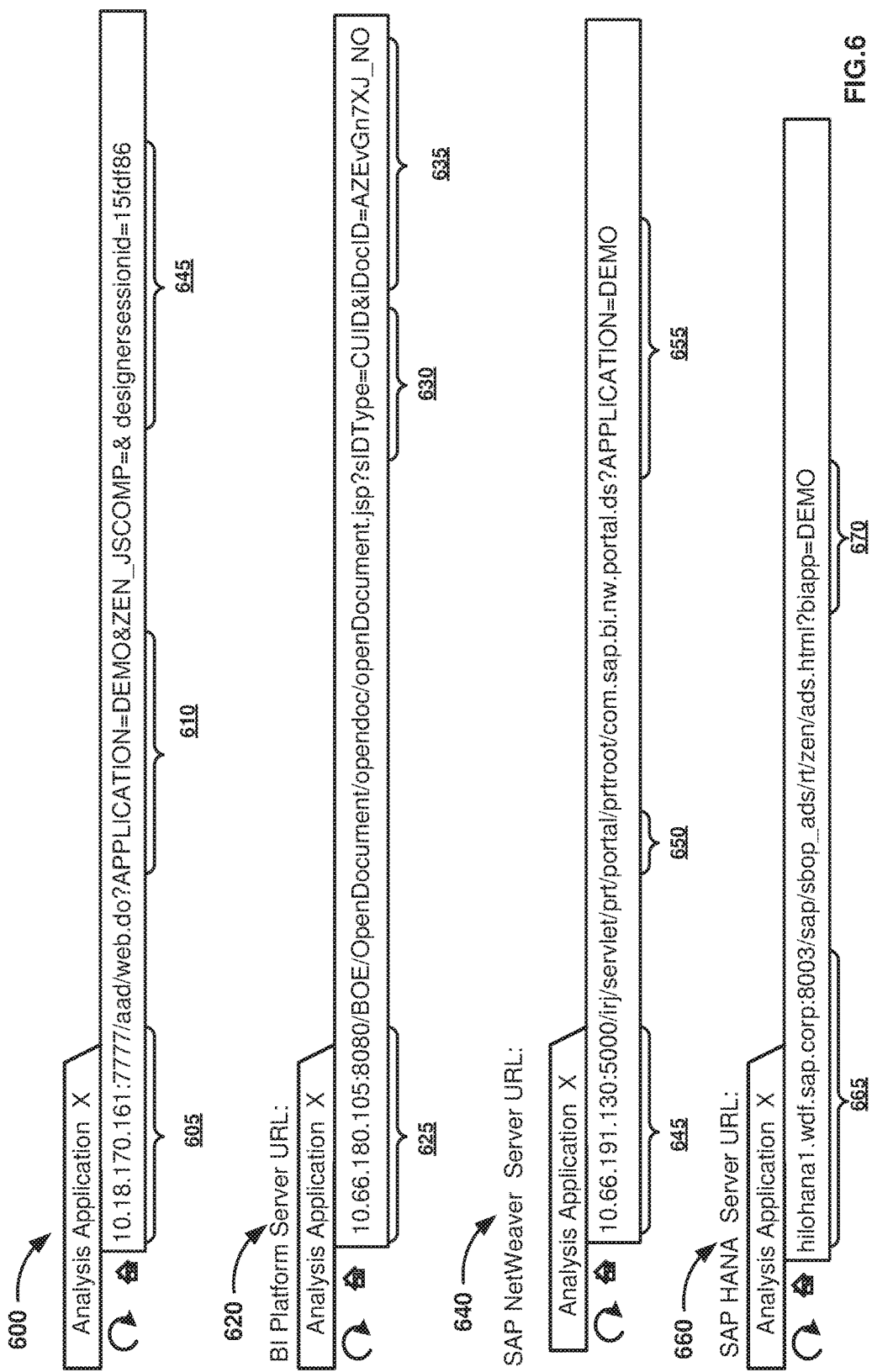
FIG. 6 is a block diagram illustrating embodiments of platform-dependent Uniform Resource Locators (URLs) for launching a deployed application on a mobile device.

FIG. 6 is a block diagram illustrating embodiments of platform-dependent Uniform Resource Locators (URLs) for launching a deployed application on a mobile device. The URLs encodes connection information for a browser on a mobile device so that the browser may access the application. These URLs may be converted into a visual format, such as the visually encoded dynamic codes discussed in FIG. 4. In one embodiment, the URLs may be converted into QR codes, such as the QR code 330, FIG. 3. The format of the URLs may consist of a number of parts, some of which may be dynamically generated. In one embodiment, the format depends on the mode of the application, i.e. the chosen platform and server for configuring and deploying the application.

In one embodiment, URL 600 is displayed in a web browser and corresponds to an analysis application such as the Analysis Application 267, FIG. 2, which is deployed on a local embedded server, such as Embedded Web Server 310. Part 605 of the URL 600 is for the IP address and port. The port 545 may be configured in a preference tool, which may be provided by the design environment used for developing the application. In another embodiment, the port may be set to "auto", which means that a random port is chosen during startup of the design environment. For example, such design environment may be environment 100 in FIG. 1. The URL 600 may include the name of the deployed analysis application. Part 610 defines the name by the following syntax "APPLICATION=DEMO", which means that the application name that is configured and launched through this URL 600 has a name "DEMO". The URL 600 includes part 645, which presents identification (ID) for a designer session that is different for each and every start of the analysis application. Having such part in the URL may help in securing the access to the analysis application during its development stages.

A URL 620 may also correspond to an analysis application such as the Analysis Application 267, FIG. 2, that is deployed on a business intelligence (BI) platform server, such as the as SAP® BusinessObjects™ Business Intelligence Platform provided by SAP AG. The URL 620 format consists of part 625 that defines the IP address and the port where the deployed analysis application may be located. The BI Platform uses object identifiers such as globally unique IDs (GUIDs), cluster unique IDs (CUIDs) for identification of each stored document and is displayed in part 630. CUID of the analysis application deployed on the BI Platform is provided in part 635 and the analysis application has the CUID "AZEvGn7XJ_NO".

A URL 640 may also correspond to an analysis application such as the Analysis Application 267, FIG. 2, that is deployed on a platform, such as SAP NetWeaver® platform provided by SAP AG. The URL 640 starts with part 645 which includes the IP address and a port. In one embodiment, the URL 640 may point to an SAP NetWeaver® Portal, which is part of the SAP NetWeaver® platform, which is defined in part 650. In part 655, the name of the analysis application that is deployed on the SAP Netweaver® platform is provided— "APPLICATION=DEMO".

A URL 660 may also correspond to an analysis application such as the Analysis Application 267, FIG. 2 that is deployed on a database platform, such as SAP HANA® platform provided by SAP AG. The URL 660 has a format that starts with part 665, which includes the location where the deployed analysis application is stored. The URL 665 includes part 670 that displays the name of the application "application=DEMO". The structure of the URL generated after the deployment of the application may be dependent of the platform used for deploying the application, and may also comprise dynamic part that change each time the application is updated, a change in the platforms is made, or other reason.

Figure 7:
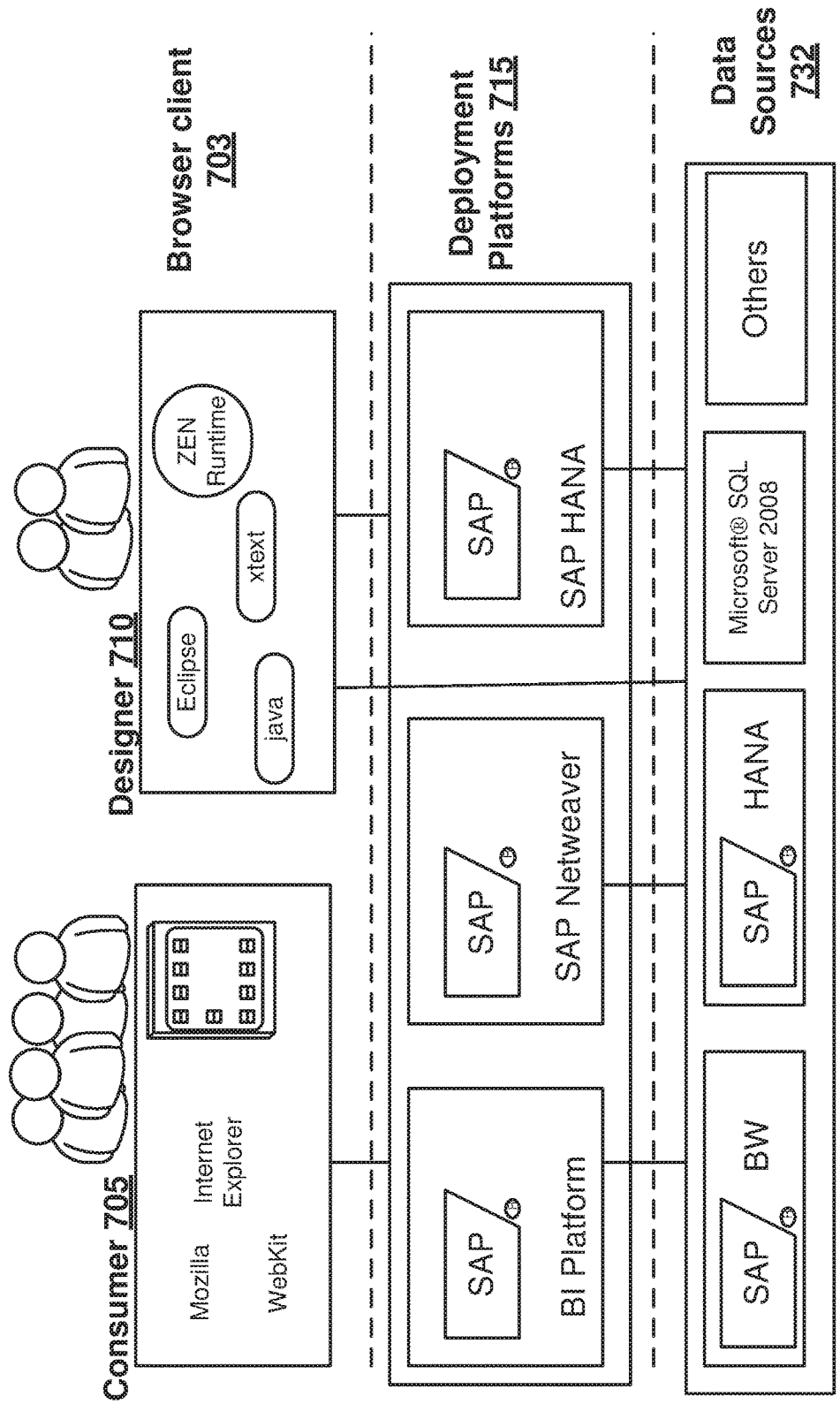
FIG. 7 is a block diagram illustrating browser clients, deployment platforms and data sources that may be used when developing, deploying and testing an application for both desktop and mobile rendering.

FIG. 7 is a block diagram illustrating browser clients, deployment platforms and data sources that may be used when developing, deploying and testing an application for both desktop and mobile rendering. A designer 710 may use different development environments or runtime environment for designing, developing, configuring and deploying an application. For example, the designer 710 may use Eclipse® runtime environment when building a web application that will be used by customer 705. In one embodiment, the designer 710 and the customer 705 may use different browser clients 703 for visualizing the build application in a working mode. The customer 705 may load the build web application through a web browser on a mobile device for example. In another embodiment, the customer 705 may load the build web application on a remote device, such as a mobile device. The designer 710 may design and develop the application and configure it to be deployed on deployment platforms 715. Different version of the application may be deployed a number of times on different options of the deployment platforms 715. In one embodiment, the deployment platforms 715 may include SAP® BusinessObjects™ Business Intelligence Platform, SAP NetWeaver® platform, and SAP HANA® platform provided by SAP AG. The designer 710 and the consumer 705 may communicate with the deployment platform 715 when deploying and launching the deployed application. The deployment platforms 715 communicate with data sources 732. The data sources 732 may be database systems that are enabled to store developed and deployed applications. The data sources 732 may provide data warehousing functionality. In one embodiment, business information from developed application and external data sources may be integrated and consolidated into the data sources 732. In one embodiment, data sources 732 may include SAP® Business Information Warehouse system and SAP HANA® Database, both provided by SAP AG, Microsoft® SQL Server 2008 provided by Microsoft Corporation, etc.

Figure 8:
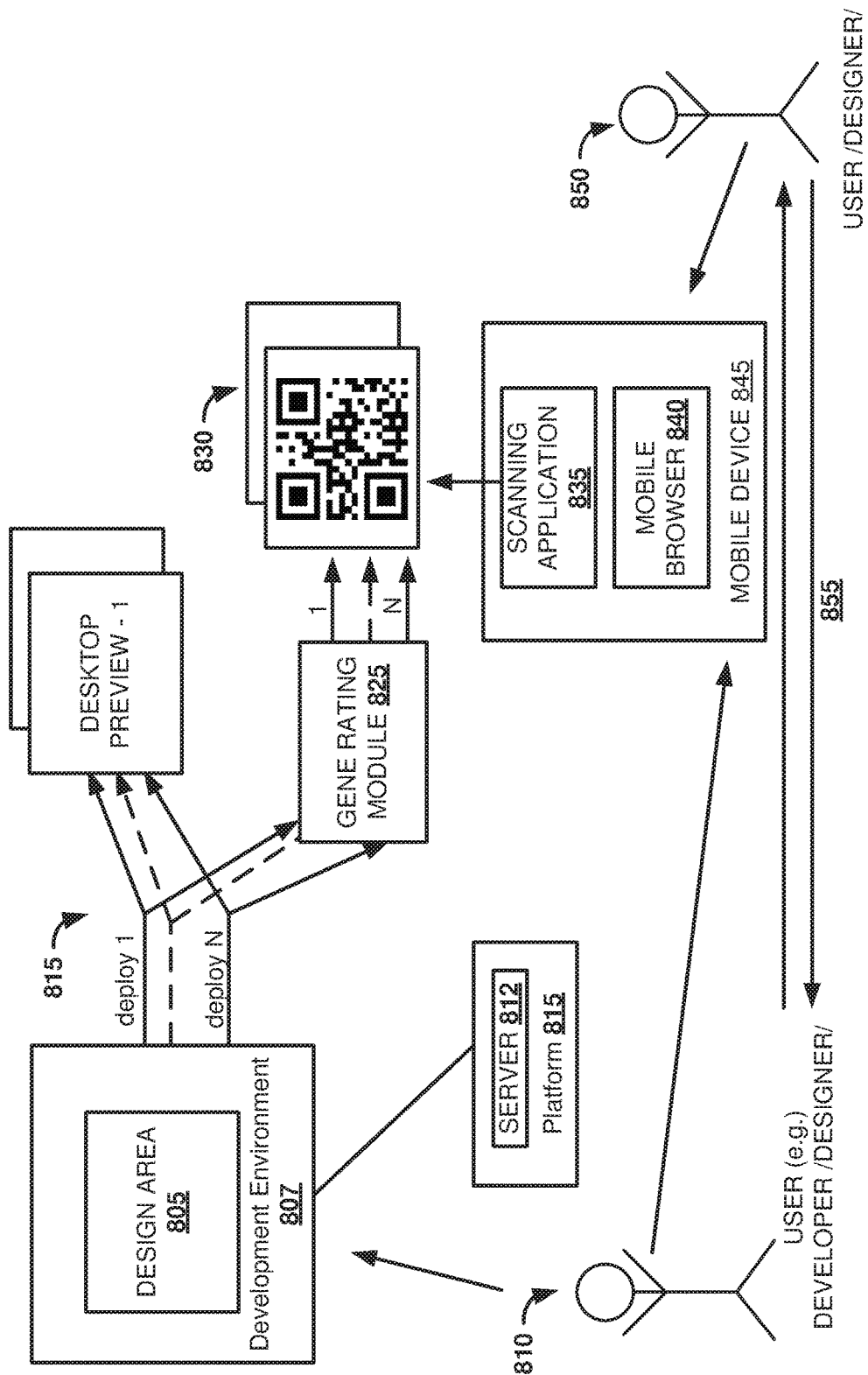
FIG. 8 is a block diagram illustrating an embodiment of a system for testing an application on a mobile device by generating QR codes corresponding to iterative versions of the application.

FIG. 8 is a block diagram illustrating an embodiment of a system for testing an application on a mobile device by generating visually encoded dynamic codes, for example, QR code, corresponding to iterative versions of the application. At a design area 805 part of a development environment 807, the application is designed and developed by a user 810. The user 810 may be a developer or a designer. For example, the design area 805 corresponds to the design area 112, FIG. 1, and the development environment 807 corresponds to the environment 100, FIG. 1. The built application is deployed during one of the steps from deployment steps 815. The application may be deployed on a platform 815 including a server 812. The application may be hosted on the server 812. The deployment may happen on different platforms providing servers that may host the application. In one embodiment, the platforms used during a step from the deployment steps 815 may be the deployment platforms 715 in FIG. 7. The deployed application may be a web application that may be previewed on a desktop machine, for example, by loading a URL in a web browser. The development environment 807 may be connected to a generating module 825 that during the deployment steps 815 generates a visually encoded dynamic code, which may be a QR code 830. For each of the deployment steps a different QR code may be generated that corresponds to the specific version of the application, the platform used for the deployment, specific characteristics of the developer's session, etc.

In one embodiment, the QR code 830 may be scanned from an authorized mobile device 845 by a user 850. The user 850 may be such as the user 810 that used the development environment 807 to participate in the design cycle for the application and uses the mobile device 845 to test the application in a working environment. The mobile device 845 may have a scanning application 835 installed that may scan the QR code 830 and then load a preview of the application in e mobile browser 840. The QR code 830 corresponds to an URL generated during deployment that may be used to display the application in a desktop browser and in a mobile browser. In one embodiment, the user 810 may restart the development environment 807 and then redeploy the application to make it accessible again. The redeployment will generate a new URL and also a new QR code may be generated to correspond to the redeployed application. For example, the QR code includes the change to the URL due to the fact that by restarting the development environment 807 a new developer session is generated. The user 850 that may test the application on the mobile device 845 may communicate with the user 810 that develops the application to further improve the current version of the application. The improvements may be based on operations and transactions performed with the loaded application on the mobile device 845. Thus, through the communication between testers and developers, a next version of the application may be generated in the design area 805. The next version may be deployed again, and the generating module 825 may generate another visually encoded dynamic code. The next version may be deployed on a different platform from the platform 815. That results in different structure of the URL that is generated during deployment and that is later encrypted in the QR code. In another embodiment, user 810 may perform both the development and the testing operations related to building an application in the development environment 807. The testing operations may be such as simulations of the performance in real-time environment with real tasks and load. In one embodiment, after generating a next version of the application and redeploying the new version, the previous version that may be launched through the QR code 830 may no longer be accessed. This may be implemented for security reasons required during the development stage of the application, before it becomes publically available with a stable URL for launching. The URLs generated through the iterations of development and testing are dynamic and are related to the specific characteristics of the development and deployment process.

Figure 9:
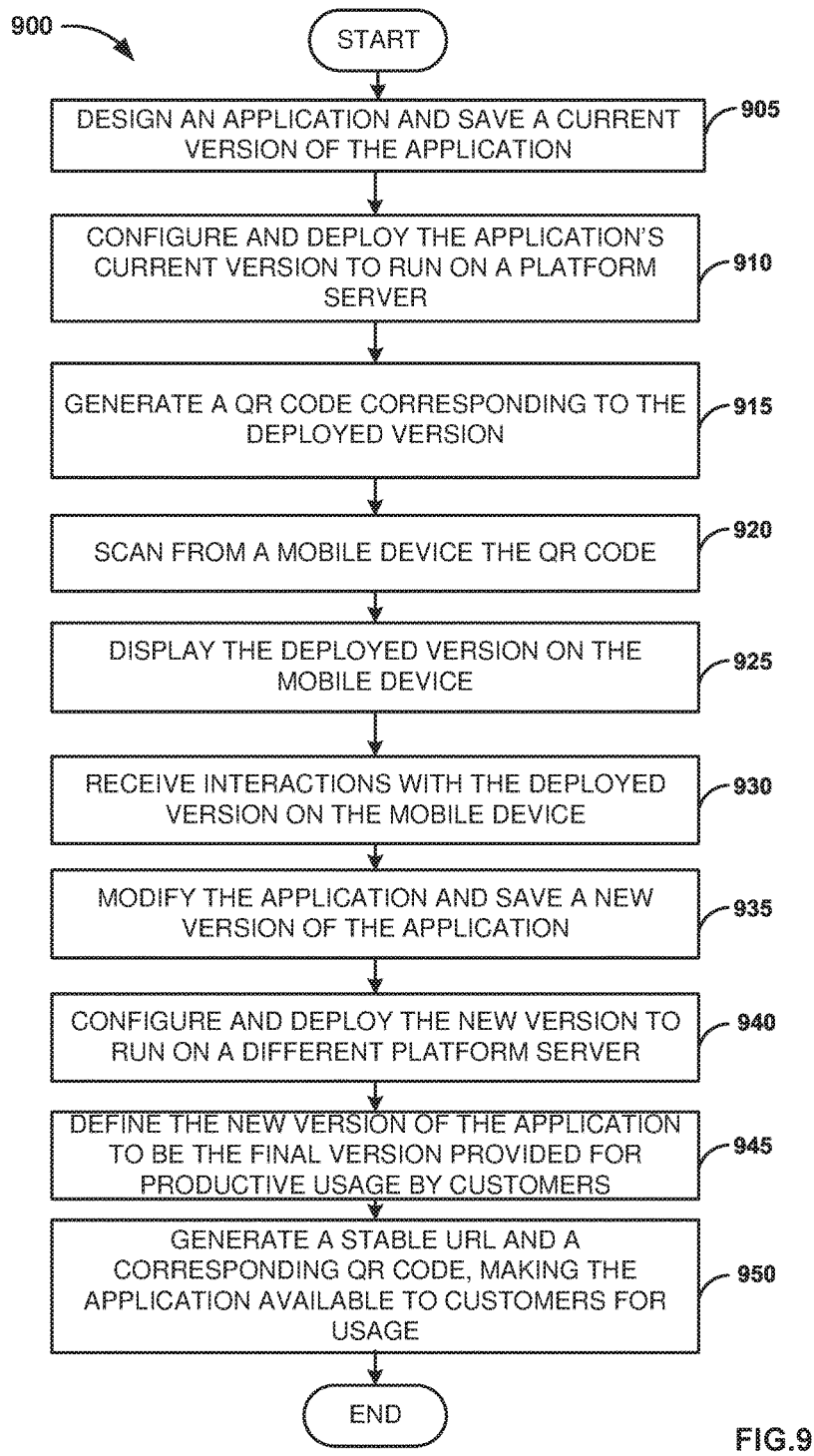
FIG. 9 is a flow diagram illustrating an embodiment of a method for using or testing of an application on a mobile device by generating different QR codes corresponding to dynamic URL generated through the testing cycle.

FIG. 9 is a flow diagram illustrating an embodiment of a method 900 for using or testing of an application on a mobile device by generating different QR codes corresponding to dynamic URL generated through the testing cycle. At step 905 a current version of an application is designed and saved. The designing of the application may be performed in a development environment such as the development environment 807 on FIG. 8. The current version of the application is configured to be deployed on a platform server at process step 910, and it is deployed to run on the server. The current version of the application may be displayed as a result of the deployment. The deployment process generates an URL that may be loaded in a browser application. In one embodiment, the application may be displayed in a desktop browser. At process step 915, a QR code that corresponds to the URL is generated during the deployment. In one embodiment, the generation of the QR Code may be accomplished from a design time of a development environment used for building the application. The QR code may be scanned at step 920. The scanning may be performed from a remote device such as a mobile device. The scanning step may correspond to the scanning operation discussed in FIG. 8 and may be performed from a scanning application 835. In order a mobile device having a scanning application to be able to scan a QR code, the mobile device needs to have an operational camera. At step 925, the deployed current version of the application is displayed on the mobile device.

At step 930, interactions with the deployed current version of the application may be received from the mobile device. In one embodiment, these interactions may be connected with testing processes of the application in real time environment, according to different functional and non-functional prerequisites of the customer for the application. In response to the performed interactions, at step 935, the current version of the application may be modified to generate and save a new version of the application. At step 940, the new version may be reconfigured and redeployed to run on a platform server, which may be different from the platform server used for the configuring and deploying at step 910. In one embodiment, the process 900 may further continue with generating improved versions of the application, based on testing the application in mobile environment, until the application becomes in such state so it can be released through a stable non-dynamic URL. For example, the application may be offered in mobile application stores. In one embodiment, at process step 945, the new version, configured and deployed at step 940, may be defined as the final version of the application that may be provided for productive usage by customers. At process step 950, a stable URL and a corresponding QR code may be generated. Through the stable URL and the QR code, the application may be accessed both from desktop and mobile device in productive customers' scenarios.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
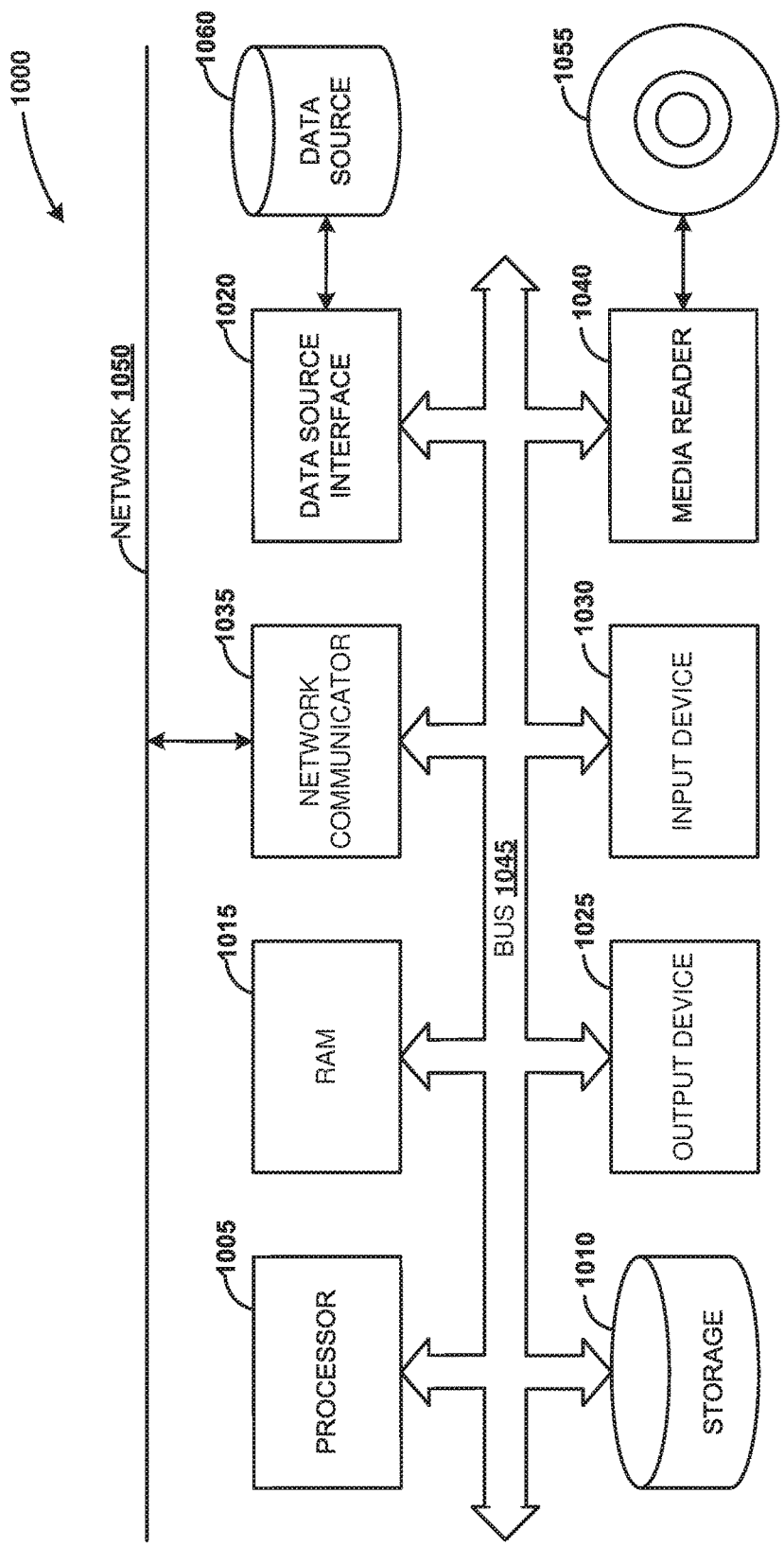
FIG. 10 is a block diagram illustrating an embodiment of a computing system in which the techniques described for deploying an application and generating a visually encoded dynamic code for loading the application onto a mobile device can be implemented.

FIG. 10 is a block diagram illustrating an embodiment of a computing system 1000 in which the techniques described for deploying an application and generating a visually encoded dynamic code for loading the application onto a mobile device. The computer system 1000 includes a processor 1005 that executes software instructions or code stored on a computer readable storage medium 1055 to perform the above-illustrated methods. The processor 1005 can include a plurality of cores. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. According to some embodiments, such as some in-memory computing system embodiments, the RAM 1015 can have sufficient storage capacity to store much of the data required for processing in the RAM 1015 instead of in the storage 1010. In some embodiments, all of the data required for processing may be stored in the RAM 1015. The stored instructions may be further compiled to generate other representations of the instructions and dynamically stored in the RAM 1015. The processor 1005 reads instructions from the RAM 1015 and performs actions as instructed. According to one embodiment, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for generating a visually encoded dynamic code for loading an application onto a remote device, the method comprising:
   configuring the application for deployment on a platform;
   deploying the application on the platform for loading the application onto the remote device; and
   generating and presenting a first visually encoded dynamic code that encrypts dynamic information stored in a form of a first uniform resource locator (URL) for locating the deployed application, wherein the first visually encoded dynamic code is configured to be decoded by the remote device to load and display the deployed application on the remote device, and wherein the first URL has a platform dependent structure that comprises dynamic parts related to deployment characteristics of the platform used for deploying the application;
   modifying the application in response to a set of user interactions with the application on the remote device;
   redeploying the modified application on the platform; and
   generating a second visually encoded dynamic code that encrypts dynamic information for locating the redeployed modified application, wherein redeploying the modified application generates a second URL that is encrypted in the second visually encoded dynamic code, and wherein the second URL has the platform dependent structure of the first URL.

2. The method of claim 1, wherein the remote device is a mobile device, and wherein the application is designed for desktop and mobile rendering.

3. The method of claim 1, wherein the first visually encoded dynamic code is selected from a group consisting of a Quick Response (QR) code, bar code, Aztec code, Shot-Code, and PDF417.

4. The method of claim 1, wherein the platform used for deploying the application is an on-premise platform comprising an embedded application server.

5. The method of claim 1, wherein the platform used for configuring and deploying the application is selected from a group consisting of SAP® BusinessObjects™ Business Intelligence Platform, SAP NetWeaver® platform, SAP HANA® platform.

6. The method of claim 1, wherein the first URL and the second URL correspond to different versions of the application defined in iterative steps during designing and testing the application on the remote device.

7. A computer system for generating a visually encoded dynamic code for loading an application onto a mobile device, the system comprising:
   a processor;
   a server for deployment of the application;
   a memory in association with the processor;
   a development environment to receive actions comprising designing, developing, testing, modifying and configuring the application on the server, wherein the application is targeted for desktop and mobile rendering;
   a generating module to generate and present visually encoded dynamic codes that encrypts dynamic information, stored in a form of uniform resource locators (URLs), for locating the deployed application, wherein the visually encoded dynamic codes correspond to different versions of the application, and wherein the URLs have a platform dependent structure and comprise dynamic parts related to deployment and authentication specific characteristics related to the server used for deploying the application; and
   a mobile device configured to:
   decode the visually encoded dynamic codes to locate iterative versions of the deployed application, wherein the visually encoded dynamic codes are scanned in iterative steps according to phases of the testing of the application on the mobile device; and
   in response to decoding the visually encoded dynamic codes, load and display a current version of the application for testing on the mobile device that corresponds to a decoded visually encoded dynamic code from the decoded visually encoded dynamic codes, wherein the development environment is further configured to receive actions of:
   redeploying the application on the server in response to the loading and displaying of the current version of the application on the mobile device; and
   generating a new visually encoded dynamic code that encrypts dynamic information for locating the redeployed application.

8. The system of claim 7, wherein the visually encoded dynamic codes are selected from a group consisting of a Quick Response (QR) code, bar code, Aztec code, Shot-Code, and PDF417.

9. The system of claim 7, wherein the server used for deploying the application is part of a platform selected from a group consisting of SAP® BusinessObjects™ Business Intelligence Platform, SAP NetWeaver® platform, SAP HANA® platform.

10. An article of manufacture for generating a visually encoded dynamic code for loading an application on a mobile device, comprising a non-transitory computer readable storage medium including executable instructions, which when executed by a computer, cause the computer to:
   configure the application in a development environment for deployment on a platform;
   deploy the application on the platform for loading the application onto the mobile device;
   generate and present a first visually encoded dynamic code that encrypts dynamic information stored in a form of a first uniform resource locator (URL) for locating the deployed application on a network, wherein the first visually encoded dynamic code is configured to be decoded by the mobile device to load and display the deployed application on the mobile device, and wherein the first URL has a platform dependent structure that comprises dynamic parts related to deployment characteristics of the platform used for deploying the application;
   modify the application in response to a set of user interactions with the application on the mobile device;
   redeploy the modified application on the platform; and
   generate a second visually encoded dynamic code corresponding to the redeployed modified application, wherein the second visually encoded dynamic code is used for loading and displaying the redeployed application on the remote device, redeploying the application further comprises generating a second URL that is encrypted in the second visually encoded dynamic code, and the second URL has the platform dependent structure of the first URL.

\* \* \* \* \*